United States Patent
Hetcher et al.

(10) Patent No.: US 9,611,636 B2
(45) Date of Patent: Apr. 4, 2017

(54) MOBILE WATER RECLAIMING SYSTEM

(71) Applicant: Super Products LLC, New Berlin, WI (US)

(72) Inventors: Jason David Hetcher, Waukesha, WI (US); Daniel J. Koziczkowski, Waukesha, WI (US); Curtis J. Ladish, Brookfield, WI (US); Michael James Jacobson, DePere, WI (US); Steven Iding, Milwaukee, WI (US)

(73) Assignee: Super Products LLC, New Berlin, WI (US)

( * ) Notice: Subject to any disclaimer, the term of this patent is extended or adjusted under 35 U.S.C. 154(b) by 404 days.

(21) Appl. No.: 14/152,028

(22) Filed: Jan. 10, 2014

(65) Prior Publication Data

US 2014/0196246 A1    Jul. 17, 2014

Related U.S. Application Data

(60) Provisional application No. 61/751,298, filed on Jan. 11, 2013.

(51) Int. Cl.
*E03F 7/10* (2006.01)
*B01D 29/56* (2006.01)
*C02F 1/00* (2006.01)

(52) U.S. Cl.
CPC ............... *E03F 7/10* (2013.01); *B01D 29/56* (2013.01); *C02F 1/004* (2013.01)

(58) Field of Classification Search
CPC ......... E03F 7/10; B01D 29/56; B01D 29/009; B01D 29/885; B01D 29/0075–29/0088
See application file for complete search history.

(56) References Cited

U.S. PATENT DOCUMENTS

| | | | | | |
|---|---|---|---|---|---|
| 3,635,343 A | * | 1/1972 | Holland | ............. | B01D 21/0012 210/104 |
| 3,823,823 A | * | 7/1974 | Dokter | ............... | B01D 29/0072 210/110 |

(Continued)

FOREIGN PATENT DOCUMENTS

| EP | 1 258 572 B1 | 11/2002 |
|---|---|---|
| EP | 1 631 726 B1 | 4/2012 |

OTHER PUBLICATIONS

Kaiser/Whale "Sewer cleaning jet-vac with continuous water recycling" brochure, publicly available at least as early as Jul. 17, 2013.

(Continued)

*Primary Examiner* — Larry E Waggle, Jr.
*Assistant Examiner* — Henry Hong
(74) *Attorney, Agent, or Firm* — Andrus Intellectual Property Law, LLP

(57) ABSTRACT

A vacuum truck for dispensing water into a sewer or similar location and receiving recovered water from the sewer that includes debris to be removed therefrom. The vacuum truck includes a debris tank that receives the recovered water and retains debris removed from the recovered water. A primary and a secondary filter are positioned in the debris tank for separating debris from the recovered water. A water pump draws the recovered water through the secondary filter and provides the water to a tertiary filter that removes smaller debris from the recovered water. The recovered water from the tertiary filter is provided directly to a jetting water pump without being accumulated in a water holding tank. The vacuum truck includes a water storage tank that includes potable water for cleaning the truck or when recovered water is not available from the debris tank.

16 Claims, 2 Drawing Sheets

(56) References Cited

U.S. PATENT DOCUMENTS

| | | | | |
|---|---|---|---|---|
| 3,842,461 A | * | 10/1974 | Wurster | E03F 7/10 |
| | | | | 15/326 |
| 4,134,174 A | * | 1/1979 | Flynn | E03F 9/00 |
| | | | | 134/104.4 |
| 4,322,868 A | * | 4/1982 | Wurster | E03F 7/10 |
| | | | | 134/168 C |
| 5,295,583 A | * | 3/1994 | Bischofberger | B01D 29/03 |
| | | | | 209/17 |
| 5,312,551 A | * | 5/1994 | Perron | C02F 1/385 |
| | | | | 210/195.1 |
| 5,577,772 A | | 11/1996 | Kaiser | |
| 5,946,767 A | * | 9/1999 | Sinz | B01D 37/00 |
| | | | | 134/109 |
| 5,979,012 A | * | 11/1999 | Fritz | B01D 17/00 |
| | | | | 15/321 |
| 7,828,965 B2 | | 11/2010 | Kaiser | |

OTHER PUBLICATIONS

English translation of EP1631726.

\* cited by examiner

MOBILE WATER RECLAIMING SYSTEM

CROSS REFERENCE TO RELATED APPLICATIONS

The present application is based on and claims priority to U.S. Provisional Patent Application Ser. No. 61/751,298 the disclosure of inch is incorporated herein by reference.

BACKGROUND OF THE INVENTION

The present disclosure relates to a mobile water recycling system for use with vacuum trucks, such as sewer cleaning and hydro-excavation equipment. More specifically, the present disclosure relates to a water recycling system that removes debris from recovered sewer water and recycles the water for continuous use in the sewer cleaning process.

Presently, sewer and catch basin cleaners are available that include a large suction device for removing debris from within a sewer line. As part of the sewer and catch basin cleaner, a water pump system is included on the vehicle that creates a high pressure supply of water that can be used to clean and remove debris from within the sewer line. As part of this high pressure water cleaning system, a jetting water pump is used on the machine to create the supply of pressurized water.

Current systems used with sewer and catch basin cleaners include an onboard water tank that stores a supply of water to be used during the cleaning process. Since the size and volume of the onboard water tank is limited, the sewer cleaning and hydro-excavation equipment must be refilled on a periodic basis to allow the unit to continue to clean sewer systems.

Presently, systems exist that allow the water removed from the sewer to be cleaned and recycled for continuous use in the sewer excavation and cleaning process. Water recycling in the sewer cleaning industry is very common in Europe, and there are many water recycling systems on European sewer cleaning trucks. However, most of these systems are limited in both the filtering and amount of water that can be processed during the use of the equipment. The present disclosure addresses many of the limitations currently present in sewer cleaning and hydro-excavation units that use recycled water.

SUMMARY OF THE INVENTION

A vacuum truck, such as a combination sewer and catch basin cleaning truck sucks up sewage affluent and debris into a debris tank using an onboard vacuum system is disclosed. A water recycling system filters the water affluent and supplies the filtered water to a high pressure water pump for sewer jetting work. In accordance with the present disclosure, water recycling is the use of water from a sewer line as the jetting water to clean the same sewer line. The present disclosure differs from currently available systems based upon the combination and sequence of filtering stages. These stages provide an optimal level of water filtration for sewer jetting work, while increasing the robustness of the system. The stages of filtration are set forth below.

Primary filtration: A primary filter, such as but not limited to an ejector plate in the debris tank separate liquids from large solids. All debris and affluent material enters the debris tank on the rear side of the primary filter, such as the ejector plate. The primary filter has small clearances and passages to allow liquids and only small solids to pass to the front side of the ejector plate. The clearances and passages are adjustable from about 0.060 inch to 0.300 inch, although other sizes are contemplated.

Secondary filtration: A self-cleaning secondary filter including a filter screen is positioned within the inside the debris tank on the front side of the primary filter. The secondary filter allows liquids and material having a smaller size than those that were allowed to pass the primary filter to pass. As an example, solid particles less than 0.060 inch (0.040 inch to 0.100 inch) can pass the secondary filter. The secondary filter preferably includes a filter screen having a self-cleaning internal spray bar to remove material attached to the outside of the screen.

A solids-handling water pump sucks liquids out of the debris tank through the secondary filter. This water pump also pressurizes the water enough to force the water through a subsequent tertiary filter and beyond. The flow rate of the water pump is sized to meet the entire flow rate requirement for the jetting water pump plus the flow rate needed for both self-cleaning filters.

Tertiary filtration: The system includes a tertiary filter, which can be a self-cleaning filter screen. The tertiary filter further removes material from the water. The screen passages of the tertiary filter are typically 0.006 inch but can range from (0.001 inch to 0.050 inch). In the tertiary filter, the water is forced into the inside of a cylindrical screen. Screened material builds up on the inside of the screen and is then removed by a rotating nozzle. The downstream line, the purge line, of the rotating nozzle is routed back into the debris tank. This purging may be intermittent or continuous. Liquids passing through the screen of the tertiary filter are clean enough to pass through the jetting water pump and the rest of the system without significant wear, damage or problems.

Most of the filtered water leaving the tertiary filter is sent directly to the jetting water pump. In currently available water recycling systems, recycled water and filtered water is sent to a holding tank for storage due to the varying rate of water usage by the jetting water pump. Some fine material eventually settles in these holding tanks and must be cleaned frequently.

The present disclosure eliminates the maintenance time needed to clean the onboard storage tank by sending the filtered water directly to the jetting water pump. The system includes a potable water tank that is utilized on the sewer cleaner truck for times when water recycling is not used, or when there is not enough liquids in the debris tank for recycling to occur. A check valve on this water storage tank allows potable water to exit the tank, but recycled water cannot enter the potable water tank. This check valve also guarantees the jetting water pump will not run out of water when there is not enough liquids in the debris tank.

The rest of the filtered water leaving the tertiary filter is routed back into the debris tank and is used in the spray bar of the secondary filter. In this manner, the flow rate required by the jetting water pump may vary (from 50 to 120 gpm), and excess filtered water will simply be returned to the debris tank where is can further improve the system by further cleaning the secondary filter.

Another possible embodiment of this invention includes all of the above except without the primary filtration (ejector plate). In such an embodiment, the secondary filter is positioned in the debris tank and provides the first level of filtration. In such an embodiment, the screens of the secondary filter are cleaned with a self-cleaning spray bar that receives a supply of pressurized water.

The present disclosure could also be scaled down to provide water recycling on a hydro-excavation truck which uses much lower flow rates (3 to 25 gpm).

The present disclosure also differentiates itself from other systems by being generally maintenance free. This feature is achieved by utilizing two self-cleaning filters that use the water pressure from the system to perform the cleaning and purging.

BRIEF DESCRIPTION OF THE DRAWINGS

The drawings illustrate the best mode presently contemplated of carrying out the disclosure. In the drawings.

DETAILED DESCRIPTION OF THE DRAWINGS

Figure 1:
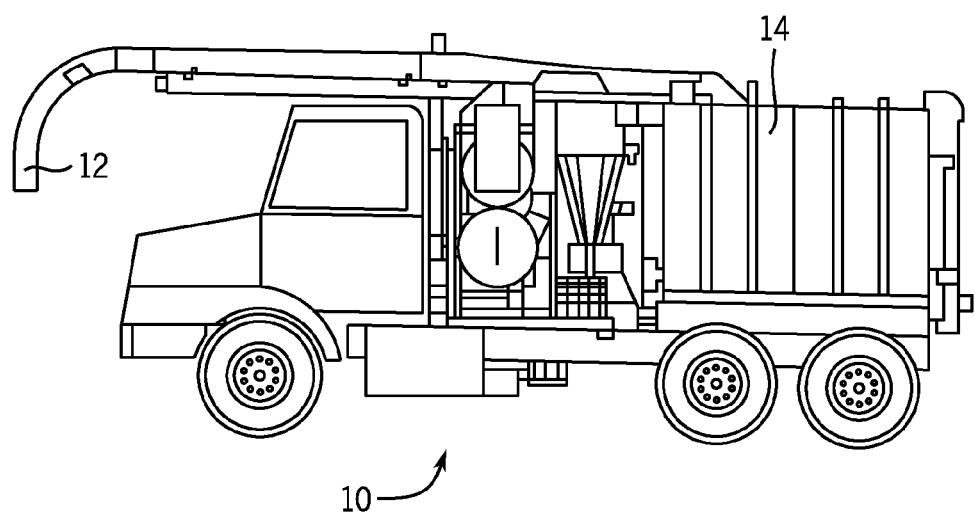
FIG. 1 is a depiction of a vacuum truck, such as a sewer and catch basin cleaner, that incorporates the system of the present disclosure.

A vacuum truck, such as a sewer and catch basin cleaning truck 10, is shown in FIG. 1. Although a sewer and catch basin cleaning truck 10 is shown in FIG. 1, the system of the present disclosure could be used with other types of vacuum trucks, such as hydro excavators, liquid vacuum trucks or industrial vacuum loaders. The sewer cleaning truck 10 shown in FIG. 1 includes an extendable suction hose 12 that removes debris from within a sewer and stores the removed debris within an onboard debris tank 14. The cleaning truck further includes a water pump system that directs a high pressure flow of water into the sewer to loosen debris within the sewer and direct the loosened debris toward the suction hose 12. An example of such a cleaning truck is the Camel® sold by Super Products of New Berlin, Wis. However, it should be understood that other types of vacuum trucks and systems could utilize the water recycling system of the present disclosure.

Figure 2:
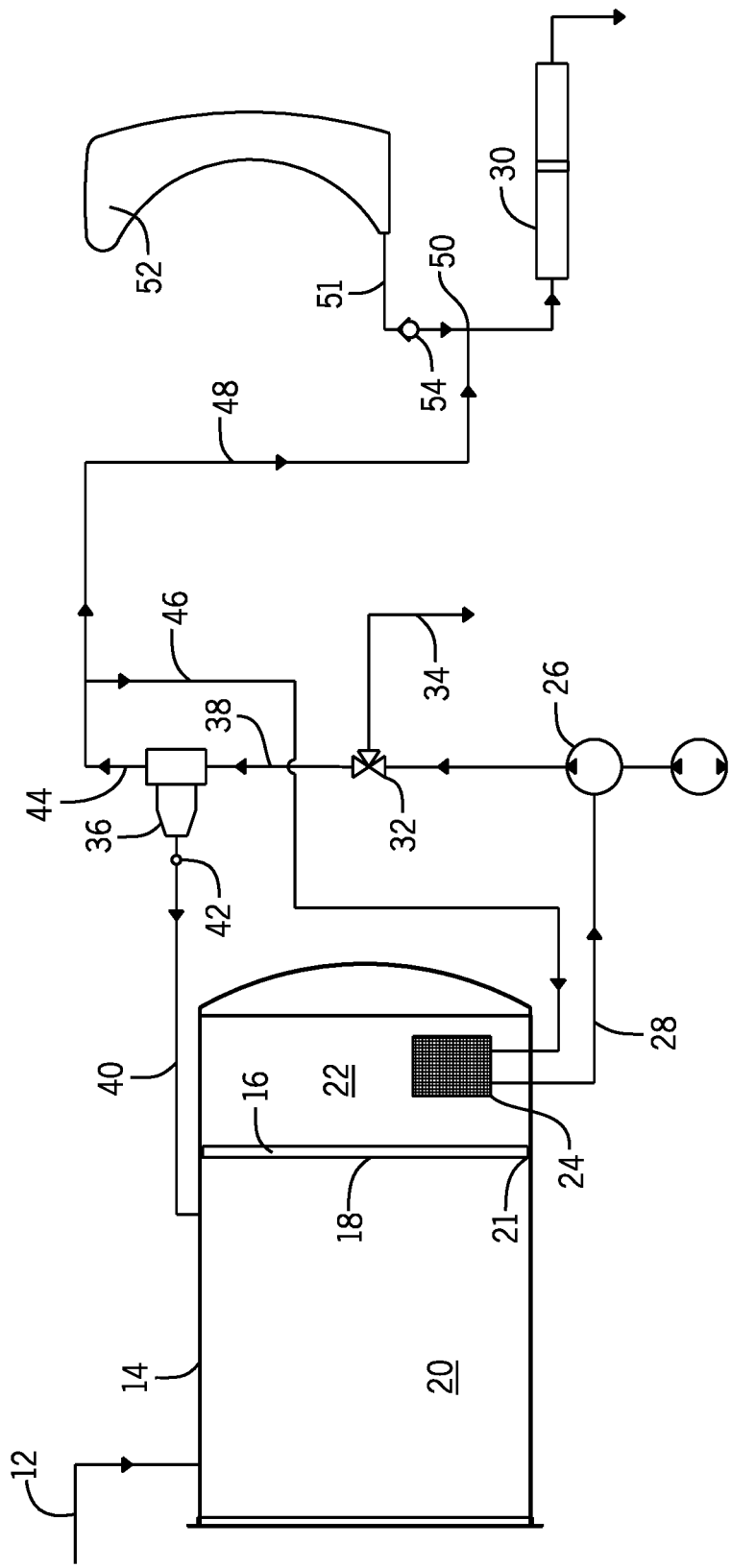
FIG. 2 is a schematic illustration of the operating system of the present disclosure.

As illustrated in FIG. 2, the cleaning truck includes a debris tank 14 that receives the supply of recovered water including solid material debris withdrawn from the sewer by the suction hose. The debris tank 14 is mounted onto the rear of the vehicle and is used to store the solid material reclaimed from the sewer. The solid material recovered from the sewer can include large, heavy objects such as stones, bricks and similar debris as well as light weight, floating objects such as tree branches, wood, floating debris and other similar debris. The debris recovered from the sewer is drawn into the debris tank 14 entrained in the flow of water from the sewer.

The debris tank 14 includes a primary filter 16 that is used to separate the larger solid particles from the recovered water drawn into the debris tank 14. In the embodiment shown in FIG. 2, the primary filter 16 is an ejector plate 18 that extends across the entire open interior of the debris tank 14. The edges of the ejector plate 18 are spaced from the inner walls of the debris tank to define a small clearance passageway 21 that allows liquids and only very small solids to pass from the back area 20 to the front area 22 of the debris tank 14. Additional passages may be added to the ejector plate 18 to further control the amount and filtration quality of the recovered water passing from the back area 20 to the front area 22. In the embodiment shown, the clearance between the outer edges of the ejector plate 18 and the inner wall of the debris tank 14 is adjustable between 0.060 inches to 0.300 inches. The adjustable clearance between the ejector plate 18 and the sidewalls of the debris tank 14 limits the size of solid materials that can pass into the front area 22 of the debris tank 14.

The liquid contained within the front area 22 thus includes particles that are small enough to pass around the outer edge of the ejector plate 18. In accordance with the present disclosure, a secondary filter 24 is located in the front area 22. In the preferred embodiment of the disclosure, the secondary filter 24 is a self-cleaning filter screen that is positioned within the front area 22. The secondary filter 24 is sized to allow liquids and materials having a size less than 0.060 inches (0.040 inches to 0.100 inches) to pass through the filter. In the embodiment shown, the secondary filter 24 includes a self-cleaning internal spray bar that removes materials attached to the outside of the screen to continuously clean the screen during the filtration process. As an example, the secondary filter 24 can be a self-cleaning suction screen filter, such as commercially available from VAF Filtration Systems. Although a specific type and size of secondary filter 24 is disclosed, it should be understood that other types and sizes of secondary filters 24 could be used while operating within the scope of the present disclosure. The secondary filter 24 should be sized to remove smaller solids from the supply of fluid as compared to the primary filter 16.

Although the embodiment shown in the drawing figures include both a primary filter 16, such as the ejector plate 18, and a secondary filter 24, it is contemplated that the ejector plate 18 could be eliminated. In such an embodiment, the secondary filter 24 would limit the size of the material that leaves the debris tank 14. If the ejector plate 18 is eliminated, it becomes more important that the secondary filter 24 includes a self-cleaning mechanism since larger particles will become attached to the outside of the screen of screens included in the secondary filter.

As illustrated in FIG. 2, a solids handling water pump 26 is connected to the secondary filter 24 through a suction line 28. Operation of the water pump 26 creates a flow of water from the front area 22 through the suction line 28. The flow of water in the suction line 28 is drawn through the secondary filter 24 and thus draws liquid from within the front area 22. In the embodiment illustrated, the water pump 26 is a centrifugal water pump that is operable to create a flow of 150 gallons per minute of fluid. The water pump 26 is selected such that the pump can handle the small solids being drawn through the secondary filter 24. The flow rate of the water pump 26 is selected to meet the entire flow rate requirements for the jetting water pump 30, which will be described in much greater detail below. The water pump 26 is a self-regulating pump, such as a centrifugal pump, that self-regulates the output flow to match the flow rate demand of the jetting water pump 30 without over pressurizing the system.

Fluid from the water pump 26 is directed to a three-way ball valve 32 that can be selectively positioned to either direct water back to the sewer through return line 34 or to direct the flow of water to a tertiary filter 36 through an inlet line 38. In the embodiment shown, the tertiary filter 36 is a self-cleaning filter screen that further removes materials from the water initially withdrawn from the front area 22 of the debris tank. The tertiary filter 36 includes a filtering screen having passageways in the range of 0.006 inches although other sizes are contemplated. As an example, the tertiary filter 36 can be a V-200PA automatic screen filter available from VAF Filtration Systems. Although a specific type and size of tertiary filter 36 is disclosed, it should be understood that other types and sizes of tertiary filters 36 could be used while operating within the scope of the present disclosure. The tertiary filter 36 should be sized to remove smaller solids from the supply of fluid as compared to the secondary filter 24.

In the tertiary filter 36, water in the inlet line 38 is forced into a cylindrical screen which removes solid particles from the flow of water. The screened material builds up on the inside of the screen and is removed by a rotating nozzle within the tertiary filter 36. The small particles of material removed by the tertiary filter 36 are returned to the debris tank 14 through a purge line 40. The purge line 40 includes a purge valve 42 that controls the flow of the accumulated solids and fluid from the tertiary filter 36. The purge valve 42 may be manually or automatically operated on an intermittent or continuous basis. In a simplified embodiment, the purge valve 42 can be replaced by a flow restriction device positioned between the tertiary filter 36 and the debris tank 14 to regulate the purge flow rate. In such an embodiment, the preferred flow restriction is determined simply by the diameter of the purge line 40.

The water that has passed through the tertiary filter 36 includes solid particles that are small enough such that the flow of water from the tertiary filter can be supplied directly to the jetting water pump 30. The flow of filtered fluid originally drawn from the debris tank 14 can be used in the jetting water pump of the cleaning truck 10 without having to draw water from the onboard water holding tank 52. The combination of the three filters 18, 24 and 36 allows the cleaning truck 10 to continually recycle water from within the debris tank 14 and not have to rely upon the fixed volume of the water holding tank 52.

As illustrated in FIG. 2, water leaving the tertiary filter 36 through outlet line 44 can also be returned to the secondary filter 24 through a return line 46. Since the water in the return line 46 is pressurized through operation of the water pump 26, the water in the return line 46 can be used to clean the secondary filter 24.

The remaining portion of water from the outlet line 44 of the tertiary filter 36 is supplied directly to the jetting water pump 30 through the water supply line 48. The jetting water pump 30 can be any one of varies available water pumps that operate to create a pressurized supply of water that is directed into the sewer for further cleaning. The water from the jetting water pump 30 is again withdrawn from the sewer, along with debris, by the suction hose and stored in the debris tank 14.

The water supply line 48 is connected to the jetting water pump 30 through a connection point 50. The connection point 50 is also coupled to a fresh water supply line 51 that is in fluid communication with a potable water holding tank 52 through a one-way check valve 54. The one-way check valve 54 prevents water in the water supply line 48 coming from the tertiary filter 36 from entering into the water holding tank 52. The water holding tank 52 includes a supply of potable water that is loaded onto the cleaning truck 10 and carried with the truck 10. The one-way check valve 54 can be opened to allow the jetting water pump 30 to selectively receive fresh water from the water holding tank 52 for cleaning the truck 10 and its internal components after use in cleaning a sewer. In accordance with the present disclosure, the water in the water supply line 48 coming from the tertiary filter 36 is the primary source of water for the jetting water pump 30.

As can be understood in FIG. 2, when the jetting water pump 30 is being used to clean sewers, the supply of water used by the jetting water pump 30 comes directly from the tertiary filter 36 without being sent to any holding tank. Since small particles of solids can exist within the flow of water in the supply line 48, the lack of a water holding tank for the filtered water eliminates the need for maintenance time in cleaning the water holding tank 52. The supply of water contained in the water holding tank 52 can be utilized on the cleaning truck 10 for times when water recycling is not used or when there is not enough liquid in the debris tank 14 for recycling to occur.

The jetting water pump 30 typically includes a flow rate that can vary from between 50-120 gallons per minute. Since the solid handling water pump 26 is sized to provide 150 gallons per minute, the excess water being withdrawn from the debris tank 14 by the water pump 26 is either diverted back to the debris tank 14 through the secondary filter 24 or through the purge line 40. The jetting water pump 30 draws all of the water needed during operation from the recycling system including the three stages of filtration described.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A vacuum truck for dispensing water and receiving recovered water including debris to be removed therefrom, comprising:
    a debris tank;
    a suction hose coupled to the debris tank to direct the recovered water including the debris into the debris tank;
    a water holding tank mounted to the vacuum truck to receive a supply of potable water;
    a primary filter positioned within the debris tank to separate debris larger than a first size from the recovered water;
    a secondary filter positioned within the debris tank to receive the recovered water from the primary filter to separate debris larger than a second size from the recovered water;
    a tertiary filter positioned to receive the recovered water from the secondary filter to separate debris larger than a third size from the recovered water; and
    a water pump operable to draw the recovered water through the secondary filter and to supply the recovered water at pressure to the tertiary filter;
    a return line to return a portion of the recovered water to the secondary filter to clean the secondary filter; and
    a jetting water pump that receives the recovered water directly from the tertiary filter to dispense the recovered water.

2. The vacuum truck of claim 1 wherein a flow rate of the water pump is greater than a flow rate of the jetting water pump.

3. The vacuum truck of claim 1 wherein the water holding tank is coupled to the jetting water pump.

4. The vacuum truck of claim 1 further comprising a purge line positioned between the tertiary filter and the debris tank to direct accumulated debris from the tertiary filter to the debris tank.

5. The vacuum truck of claim 1 wherein the first size of debris is larger than the second size of debris and the second size of debris is larger than the third size of debris.

6. A vacuum truck for dispensing water and receiving recovered water including debris to be removed therefrom, comprising:
a debris tank;
a suction hose coupled to the debris tank to direct the recovered water including the debris into the debris tank;
a water holding tank mounted to the vacuum truck to receive a supply of potable water;
a primary filter positioned within the debris tank to separate debris larger than a first size from the recovered water;
a secondary filter positioned within the debris tank to receive the recovered water from the primary filter to separate debris larger than a second size from the recovered water;
a tertiary filter positioned to receive the recovered water from the secondary filter to separate debris larger than a third size from the recovered water;
a one-way valve positioned between a water supply line extending from the tertiary filter and the water holding tank to prevent the flow of recovered water into the water holding tank; and
a jetting water pump that receives the recovered water directly from the tertiary filter to dispense the recovered water, wherein the water holding tank is coupled to the jetting water pump.

7. A vacuum truck for dispensing water and receiving recovered water including debris to be removed therefrom, comprising:
a debris tank;
a suction hose coupled to the debris tank to direct the recovered water including the debris into the debris tank;
a primary filter positioned within the debris tank to separate debris larger than a first size from the recovered water;
a secondary filter positioned within the debris tank to receive the recovered water from the primary filter to separate debris larger than a second size from the recovered water;
a tertiary filter positioned to receive the recovered water from the secondary filter to separate debris larger than a third size from the recovered water;
a purge line positioned between the tertiary filter and the debris tank to direct accumulated debris from the tertiary filter to the debris tank;
a purge valve positioned within the purge line, wherein the purge valve controls a flow of the accumulated debris from the tertiary filter to the debris tank; and
a jetting water pump that receives the recovered water directly from the tertiary filter to dispense the recovered water.

8. A water reclaiming system for use on a truck having a debris tank that receives recovered water including debris, the system comprising:
a primary filter positioned within the debris tank to separate debris larger than a first size from the recovered water;
a secondary filter positioned within the debris tank to receive the recovered water from the primary filter to separate debris larger than a second size from the recovered water;
a tertiary filter positioned to receive the recovered water from the secondary filter to separate debris larger than a third size from the recovered water;
a water pump operable to draw the recovered water through the secondary filter and to supply the recovered water to the tertiary filter;
a return line to return a portion of the recovered water to the secondary filter to clean the secondary filter; and
a jetting water pump that receives the recovered water directly from the tertiary filter to dispense the recovered water.

9. The water reclaiming system of claim 8 wherein a flow rate of the water pump is greater than a flow rate of the jetting water pump.

10. The water reclaiming system of claim 8 further comprising a water holding tank mounted to the truck to receive a supply of potable water, wherein the water holding tank is coupled to the jetting water pump.

11. A water reclaiming system for use on a truck having a debris tank that receives recovered water including debris, the system comprising:
a primary filter positioned within the debris tank to separate debris larger than a first size from the recovered water;
a secondary filter positioned within the debris tank to receive the recovered water from the primary filter to separate debris larger than a second size from the recovered water;
a tertiary filter positioned to receive the recovered water from the secondary filter to separate debris larger than a third size from the recovered water;
a jetting water pump that receives the recovered water directly from the tertiary filter to dispense the recovered water;
a water holding tank mounted to the truck to receive a supply of potable water, wherein the water holding tank is coupled to the jetting water pump; and
a one-way valve positioned between a water supply line extending from the tertiary filter and the water holding tank to prevent the flow of recovered water into the water holding tank.

12. A vacuum truck operable to dispense water into a sewer and recover water from the sewer including debris, comprising:
a debris tank;
a suction hose coupled to the debris tank to direct the recovered water from the sewer including the debris into the debris tank;
a secondary filter positioned within the debris tank to receive the recovered water, wherein the secondary filter includes a screen that separates debris larger than a second size from the recovered water;
a water pump operable to draw the recovered water through the screen of the secondary filter;
a tertiary filter positioned to receive the recovered water from the water pump, wherein the tertiary filter separates debris larger than a third size from the recovered water;
a return line to return a portion of the recovered water to clean the screen of the secondary filter;
a jetting water pump positioned to receive the recovered water directly from the tertiary filter such that the recovered water is dispensed by the jetting water pump; and
a water holding tank mounted to the vacuum truck to receive a supply of potable water, wherein the water holding tank is coupled to the jetting water pump to selectively supply the potable water to the jetting water pump.

13. The vacuum truck of claim 12 further comprising a primary filter positioned within the debris tank to separate debris larger than a first size from the recovered water, wherein the primary filter includes an ejector plate positioned within the debris tank, wherein the recovered water passes from a first side of the ejector plate to a second side of the ejector plate to separate debris from the recovered water and wherein the secondary filter is positioned on the second side of the ejector plate.

14. The vacuum truck of claim 12 further comprising a one-way valve positioned between a water supply line from the tertiary filter and the water holding tank to prevent a flow of the recovered water into the water holding tank.

15. The vacuum truck of claim 12 wherein a flow rate of the water pump is greater than a flow rate of the jetting water pump.

16. The vacuum truck of claim 12 further comprising a purge line positioned between the tertiary filter and the debris tank to direct accumulated debris from the tertiary filter to the debris tank.

* * * * *